United States Patent
Li et al.

(10) Patent No.: US 10,146,440 B2
(45) Date of Patent: Dec. 4, 2018

(54) APPARATUS, SYSTEM AND METHOD FOR OFFLOADING COLLISION CHECK OPERATIONS IN A STORAGE DEVICE

(71) Applicant: INTEL CORPORATION, Santa Clara, CA (US)

(72) Inventors: Peng Li, Hillsboro, OR (US); Anand S. Ramalingam, Beaverton, OR (US); Jawad B. Khan, Cornelius, OR (US); William K. Lui, Portland, OR (US); Divya Narayanan, Hillsboro, OR (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 16 days.

(21) Appl. No.: 15/385,791

(22) Filed: Dec. 20, 2016

(65) Prior Publication Data

US 2018/0173418 A1 Jun. 21, 2018

(51) Int. Cl.
*G06F 3/06* (2006.01)

(52) U.S. Cl.
CPC ............ *G06F 3/061* (2013.01); *G06F 3/0655* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 6,523,102 B1 * | 2/2003 | Dye | ...................... | G06F 12/023 709/247 |
| 7,155,577 B1 * | 12/2006 | Kiselev | ............. | G06F 17/30362 711/141 |
| 9,141,554 B1 * | 9/2015 | Candelaria | .......... | G06F 12/0864 |
| 9,323,664 B2 | 4/2016 | Yu et al. | | |
| 9,747,212 B2 * | 8/2017 | Chen, Jr. | ............. | G06F 12/0848 |

(Continued)

OTHER PUBLICATIONS

Pagiamtzis, K. and A. Sheikholeslami, "Content-Addressable Memory (CAM) Circuits and Architectures: A Tutorial and Survey", IEEE Journal of Solid-State Circuits, vol. 41, No. 3, Mar. 2006, Department of Electrical and Computer Engineering, University of Toronto, Toronto, on M5S 3G4, Canada, Total 16 pp.

*Primary Examiner* — Midys Rojas
*Assistant Examiner* — Khoa D Doan
(74) *Attorney, Agent, or Firm* — Konrad Raynes Davda & Victor LLP; David W. Victor

(57) ABSTRACT

Provided are an apparatus, system and method for offloading collision check operations in a memory storage device to a collision check unit. A collision check unit includes a collision table including logical addresses for pending Input/Output (I/O) requests. An I/O request is received to a target logical address addressing a block of data in the non-volatile memory. The logical address is sent to the collision check unit. Resources to transfer data with respect to the transfer buffer to data for the I/O request are allocated in parallel while the collision check unit is determining whether the collision table includes the target logical address. The collision check unit determines whether the collision table includes the target logical address and returns indication of whether the collision table includes the target logical address indicating that current data for the target logical address is already in the transfer buffer.

25 Claims, 8 Drawing Sheets

(56) References Cited

U.S. PATENT DOCUMENTS

| | | | |
|---|---|---|---|
| 2002/0078302 A1* | 6/2002 | Favor | G06F 12/0857 711/133 |
| 2002/0095426 A1* | 7/2002 | Ishida | G06F 17/30988 |
| 2003/0126357 A1* | 7/2003 | Wu | G11C 11/406 711/106 |
| 2003/0177326 A1* | 9/2003 | Luick | G06F 12/10 711/169 |
| 2003/0188107 A1* | 10/2003 | Hill | G06F 9/383 711/137 |
| 2004/0068617 A1* | 4/2004 | Hardage, Jr. | G06F 12/0855 711/141 |
| 2004/0075661 A1* | 4/2004 | Yamaguchi | G06T 1/20 345/441 |
| 2004/0098720 A1* | 5/2004 | Hooper | G06F 9/3851 718/102 |
| 2004/0199729 A1* | 10/2004 | Ross | G06F 13/1631 711/150 |
| 2005/0135176 A1* | 6/2005 | Ramakrishnan | G11C 7/22 365/230.01 |
| 2006/0174083 A1* | 8/2006 | Barrick | G06F 9/383 711/169 |
| 2006/0282645 A1* | 12/2006 | Tsien | G06F 12/1027 711/207 |
| 2007/0088926 A1* | 4/2007 | Fields, Jr. | G06F 12/0815 711/163 |
| 2007/0094477 A1* | 4/2007 | Espasa | G06F 12/0844 711/217 |
| 2007/0113019 A1* | 5/2007 | Beukema | G06F 12/0897 711/137 |
| 2009/0013135 A1* | 1/2009 | Burger | G06F 9/3824 711/154 |
| 2010/0017572 A1* | 1/2010 | Koka | G06F 12/0815 711/159 |
| 2011/0161552 A1* | 6/2011 | Lund | G06F 12/0246 711/103 |
| 2013/0054915 A1* | 2/2013 | Chee | G06F 9/526 711/163 |
| 2013/0339628 A1* | 12/2013 | Alexander | G06F 12/00 711/144 |
| 2014/0040541 A1* | 2/2014 | Yoo | G06F 12/02 711/105 |
| 2014/0189250 A1* | 7/2014 | Kosinski | G06F 12/0895 711/138 |
| 2015/0032936 A1* | 1/2015 | Yu | G06F 12/0246 711/103 |
| 2015/0186275 A1* | 7/2015 | Moga | G06F 12/0811 711/122 |
| 2017/0177483 A1* | 6/2017 | Vinod | G06F 12/0815 |

* cited by examiner

Collision Search Descriptor

Collision Index Entry

APPARATUS, SYSTEM AND METHOD FOR OFFLOADING COLLISION CHECK OPERATIONS IN A STORAGE DEVICE

TECHNICAL FIELD

Embodiments described herein generally relate to an apparatus, system and method for offloading collision check operations in a storage device.

BACKGROUND

Solid state storage devices (for example, solid state drives or SSDs) may be comprised of one or more packages of non-volatile memory dies implementing NAND memory cells, where each die is comprised of storage cells, where storage cells are organized into pages and pages are organized into blocks. Each storage cell can store one or more bits of information. A solid state storage device (SSD) of NAND memory cells uses a logical-to-physical ("L2P") table to map logical addresses, such as logical block addresses (LBAs), to NAND physical addresses. Each entry of the L2P table is an Indirection Unit (IU). The indirection granularity is typically 4 KB, i.e., each IU maps eight 512B sectors or one 4 KB sector to a portion of a physical NAND page.

The SSD uses an internal transfer buffer, which may be implemented using Static Random Access Memory (SRAM), to transfer data between the NAND storage and the host. The SSD uses a collision bit in each L2P table entry to indicate if the corresponding IU is currently in the transfer buffer, as part of host-writes or due to internal relocations. If the collision bit indicates the data is in the transfer buffer, then the data for the corresponding IU is in the transfer buffer and will be written to NAND. The collision bit allows detection and handling of cases where the same data-range is written/relocated/read in the NAND due to overlapping requests (e.g., a host write may write to a data range that is in process of being relocated).

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
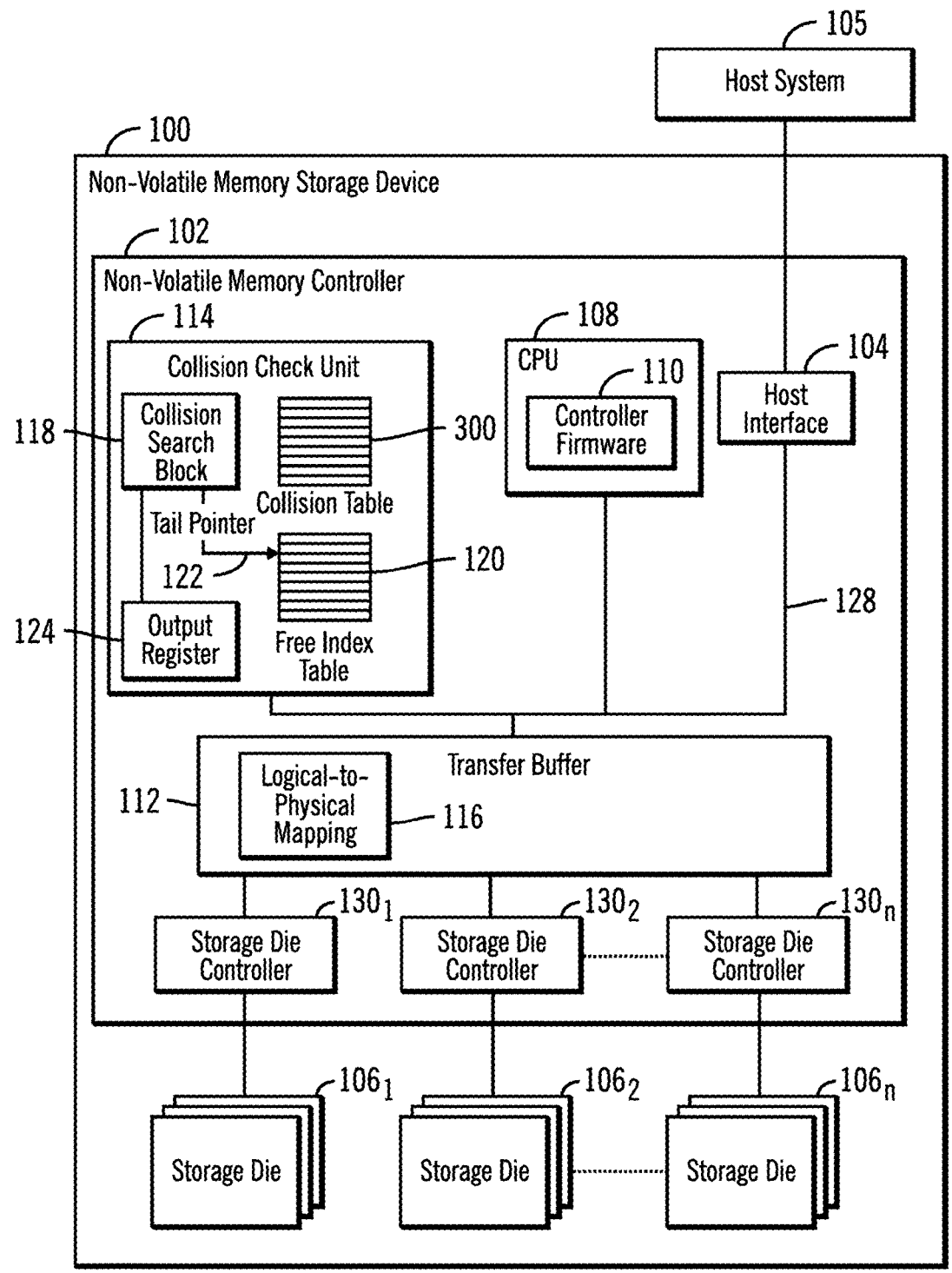
FIG. 1 illustrates an embodiment of a non-volatile memory storage device.

In SSD implementations that include a collision bit in each logical-to-physical (L2P) table entry to indicate if the corresponding IU is currently in the transfer buffer for any host write requests, the SSD sets the collision bit(s) to '1' for the IU(s) in the L2P table entry before the data transfer begins. The bit is cleared when the transfer completes. When the host reads/writes an IU, the SSD first checks the collision bit of the IU in the L2P table. If the bit is '1', the SSD completes the data transfer for the previous request before processing the current request. This process is referred to as "collision check". The same operation also applies for SSD internal-relocations, e.g., defragmenting, of NAND blocks. Before the SSD firmware relocates an IU to a different NAND address, a collision check is performed. If a collision is detected, the IU is considered invalid, and need not be relocated. If there is no collision, the SSD will set the collision bit to '1', start the data relocation process, and clear the collision bit when the relocation completes.

There is a need in the art for improved techniques for performing collision check operations in a memory storage device. Described embodiments provide techniques to optimize and increase the speed of operations to process Input/Output (I/O) requests by offloading collision check operations to separate hardware implementing a collision check unit to determine whether data in a memory storage device for a logical address subject to an I/O request is located in a buffer. With described embodiments, while the memory storage device controller firmware is performing tasks related to processing an I/O request, such as allocating a work container and other resources for the transfer, a separate collision check unit implemented in separate hardware from the processor executing the controller firmware, may perform the collision check operations in parallel to the controller firmware setup operations.

The logical-to-physical table used to map logical memory addresses to physical memory addresses may implemented in a main memory and/or a transfer buffer, which may comprise a separate byte addressable write-in-place memory (e.g., Static Random Access Memory (SRAM), Dynamic Random Access Memory (DRAM), 3D crosspoint Memory, etc.) from the block addressable memory device (e.g., SSD NAND) to which the read and write requests are directed. Implementing the collision check operations in separate collision check unit hardware eliminates the need for collision bits in the logical-to-physical (L2P) table and eliminates read and write operations to the L2P table in the main memory and buffer for collision check operations, which increases the duration of the main memory and buffer by avoiding wear on the memory cells.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a non-volatile memory storage device 100 having a non-volatile memory (NVM) controller 102, including a host interface 104 to transfer blocks of data between a connected host system 105 and a plurality of groups of storage dies $106_1, 106_2 \ldots 106_n$ comprising a non-volatile memory of storage cells that may be organized into pages of storage cells, where the pages are organized into blocks. The non-volatile memory storage device 100 may function as both a memory device and/or a storage device in a computing system, and may be used to perform the role of volatile memory devices and disk drives in a computing system. In an embodiment, the non-volatile memory storage device 100 may comprise a solid state drive (SSD) of NAND storage dies 106.

The NVM controller 102 may include a central processing unit (CPU) 108 implementing controller firmware 110, which may be stored in or external to the CPU 108, managing the operations of the non-volatile memory storage device 100; a transfer buffer 112 comprising a memory device to cache data to be written to the storage dies $106_1, 106_2 \ldots 106_n$, and may comprise a Static Random Access Memory (SRAM) or other suitable non-volatile memory storage device; and a collision check unit 114 comprising a separate hardware device, such as application specific integrated circuit (ASIC), in which collision checking logic and tables are implemented to allow the offloading of collision checking operations, and avoid having to perform read and write accesses to the transfer buffer when performing the collision checking.

The transfer buffer 112 stores a logical-to-physical mapping 116 providing a mapping of logical addresses to which I/O requests received from the host system are directed and physical addresses in the storage dies $106_1, 106_2 \ldots 106_n$. The logical addresses may comprise logical block address (LBAs) and other logical addresses known in the art. In embodiments where the transfer buffer 112 comprises a different type of memory device than the storage dies $106_1, 106_2 \ldots 106_n$, the memory storage device 100 comprises a hybrid storage device.

In certain embodiments, the logical-to-physical mapping 116 may be maintained in another memory device in the non-volatile memory storage device 100, such as a main memory and the transfer buffer 112 may be used to buffer portions of the logical-to-physical mapping 116 in the main memory.

The collision check unit 114 includes a collision search block 118 having logic to search a collision table 300 to determine whether an input logical address from the CPU 108 matches a logical address in an entry in the collision table 300 for a pending write operation. A free index table 120 indicates entries in the collision table 300 that are free and available for assignment to an input logical address, and a tail pointer 122 indicates a next free index entry in the collision table 300 to use for a logical address to add. The collision search block 118 may produce output results in an output register 124 indicating an index entry $300_i$ in the collision table 300 allocated to a read or write request and/or result of a collision search operation.

The storage dies $106_1, 106_2 \ldots 106_n$ and transfer buffer 112 may comprise electrically erasable and non-volatile memory cells, such as NAND dies (e.g., single level cell (SLC), multi-level cell (MLC), triple level cell (TLC) NAND memories, etc.), a ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, SRAM, and other electrically erasable programmable read only memory (EEPROM) type devices. The storage dies $106_1, 106_2 \ldots 106_n$ and transfer buffer 112 may comprise different types of memory devices, where the storage dies $106_1, 106_2 \ldots 106_n$ provide more storage space than the transfer buffer 112 which provides a cache for the storage dies $106_1, 106_2 \ldots 106_n$. In one embodiment, the transfer buffer 112 may comprise a byte addressable write-in-place memory (e.g., Static Random Access Memory (SRAM), Dynamic Random Access Memory (DRAM), 3D crosspoint Memory, etc.) and the storage dies $106_1, 106_2 \ldots 106_n$ may comprise a block addressable memory device (e.g., SSD NAND, etc.)

The host system 105 may transfer write data through the host interface 104 that is stored in the transfer buffer 112. In one embodiment, the CPU 108 and collision check unit 114 are implemented in separate hardware components within the non-volatile memory device 100. In this way, the controller firmware 110 and collision check unit 114 may perform operations in parallel to reduce processing latency.

The host interface 104 connects the memory device 100 to a host system 105. The memory device 100 may be installed or embedded within the host system 105, such as shown and described with respect to element 1008 or 1000 in FIG. 10, or the memory device 100 may be external to the host system. The host interface 104 may comprise a bus interface, such as a Peripheral Component Interconnect Express (PCIe) interface, Serial AT Attachment (SATA), Non-Volatile Memory Express (NVMe), etc.

The CPU 108, host interface 104, collision check unit 114, and transfer buffer 112 may communicate over one or more bus interfaces 128, such as a PCIe or other type of bus or interface. Data may be transferred among the host interface 104, CPU 108, transfer buffer 112, and collision check unit 114 over the bus 128 using Direct Memory Access (DMA) transfers, which bypass the CPU 108. Alternatively, the CPU 108 may be involved in transferring data among the host interface 104, transfer buffer 112, and storage dies $106_1, 106_2 \ldots 106_n$ over the bus 128. In FIG. 1, the connection between the units is shown as a bus 128. In alternative embodiments the connection among any of the components 104, 108, 114, 112 may comprise direct lines or paths and not a shared bus.

The non-volatile memory storage device 100 includes storage die controllers $130_1, 130_2 \ldots 130_n$ that manage read and write requests to blocks of data in pages of storage cells to groups of the storage dies $106_1, 106_2 \ldots 106_n$ and the transfer of data between the transfer buffer 112 and the storage dies $106_1, 106_2 \ldots 106_n$.

In the embodiment of FIG. 1, the non-volatile memory controller 102 hardware includes the collision check unit 114, CPU 108, host interface 104, and transfer buffer 112. In alternative embodiment, some of these units 104, 108, 112, and 114 may be implemented in hardware external to the non-volatile memory controller 102 in the memory storage device 100.

Figure 2:
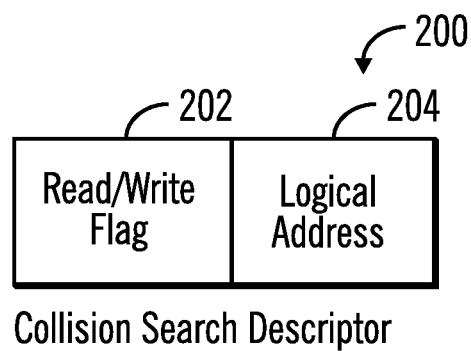
FIG. 2 illustrates an embodiment of a collision search descriptor.

FIG. 2 illustrates an embodiment of a collision search descriptor 200 the controller firmware 110 would provide to the collision check unit 114 to perform a collision search or allocate an index entry in the collision table 300, and includes a read/write flag 202 indicating whether the search and/or allocation request is for read or write request to the me storage dies $106_1, 106_2 \ldots 106_n$ and a logical address 204 of the target address of the read or write operation.

Figure 3:
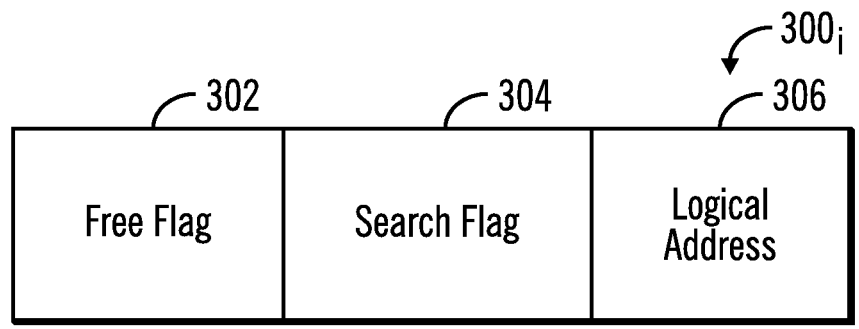
FIG. 3 illustrates an embodiment of a collision index entry.

FIG. 3 illustrates an embodiment of a collision index entry $300_i$ added to the collision table 300 and includes a free flag 302 indicating whether the entry $300_i$ is free and available for assignment to a logical address subject to a read or write request, a search flag 304 indicating whether the index entry $300_i$ should be included in a collision search; and a logical address 306 comprising the logical address subject to the allocation/search operation.

The index entries $300_i$ in the collision table 300 correspond to blocks in the transfer buffer 112 at which data for the logical address 306 in the index entry $300_i$ are stored for transfer to the storage dies $106_1, 106_2 \ldots 106_n$ (a write) or transfer to the host interface 104 (a read). In one embodiment, a separate address mapping function may be used to map logical addresses to block locations in the transfer buffer 112, and the index entries $300_i$ in the collision table may not reference specific address locations in the memory 106, but just maintain logical addresses for collision checking. In an alternative embodiment, the index entries $300_i$ may be used to determine the blocks in the transfer buffer 112 at which the data for the logical addresses identified in the index entries $300_i$ are stored.

Figure 4:
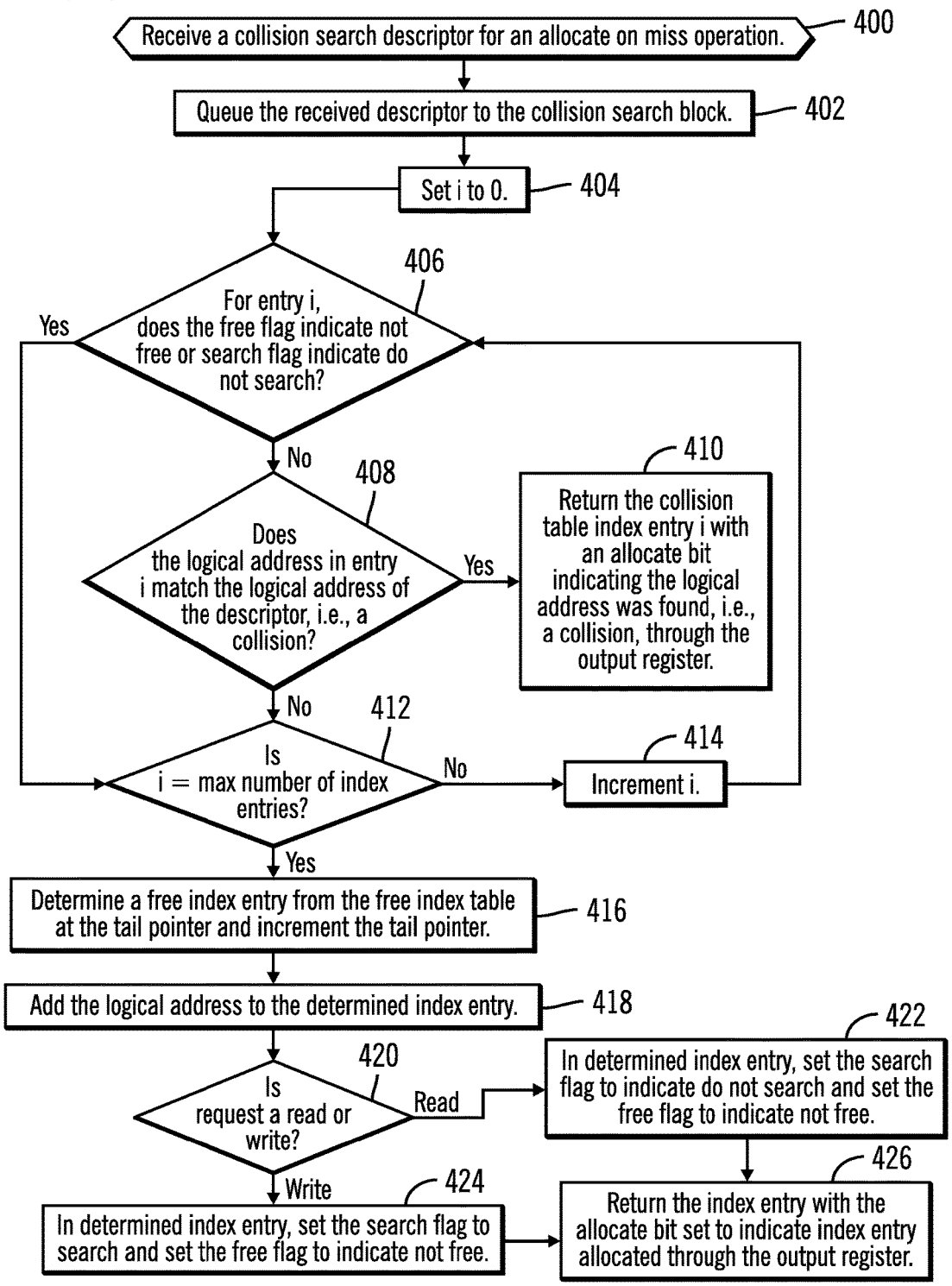
FIG. 4 illustrates an embodiment of operations performed by a collision check unit to check for a collision with a logical address.

FIG. 4 illustrates an embodiment of operations performed by the collision search block 118 to process an allocation on miss to allocate an index entry $300_i$ in the collision table 300 if the logical address subject to a read or write request is not found in an entry $300_i$ in the collision table 300. Upon receiving (at block 400) a collision search descriptor 200 for an allocate on miss operation for a logical address 204 for a read or write 206 operation, the collision search block 118 queues (at block 402) the received descriptor 200 in the collision search block 118, and sets (at block 404) the variable i to zero. If (at block 406) the index entry $300_i$ in the collision table 300 has a free flag 302 indicating the entry $300_i$ is not free or the search flag 304 indicates do not search the entry $300_i$, then the index entry $300_i$ is to be skipped and control proceeds to block 412 to consider the next entry. If (at block 406) the free flag 302 indicates free and the search flag 304 indicates search, then the collision search block 118 determines (at block 408) whether the logical address 204 in the search descriptor 200 matches the logical address 306 in the index entry $300_i$ being considered. If (at block 408) there is a match, then the collision search block 118 returns (at block 410) the index entry $300_i$ with an allocate bit indicating the logical address 204 was found, i.e., there was a collision through the output register 124.

If (at block 408) there is no collision the logical addresses 204 and 306 do not match or if the index entry $300_i$ is not to be searched (from the no branch of block 406), then if (at block 412) i is not the maximum number of entries in the collision table 300, then i is incremented (at block 414) and control proceeds back to block 406.

If (at block 412) all the searchable entries $300_i$ in the collision table 300 have been processed, then the collision search block 118 determines (at block 416) a free index entry $300_F$ from the free index table 120 at the tail pointer 122 and increments the tail pointer 122 to point to the next free index entry. The logical address 204 from the collision search descriptor 200 is added (at block 418) to the field 306 of the determined free index entry $300_F$.

If (at block 420) the read/write flag 202 in the received collision search descriptor 200 indicates a read, then the collision search block 118 sets (at block 422) the search flag 304, in the determined index entry $300_i$ to indicate do not search and sets the free flag 302 to indicate not free. If (at block 420) the request is a write, then the collision search block 118 sets (at block 424) the search flag 304, in the determined index entry $300i$, to indicate to search and sets the free flag 302 to indicate not free. From block 422 or 424, the collision search block 118 returns (at block 426) the index entry 300, with the allocate bit, set to indicate the returned index entry $300_i$ was allocated, through the output register 124, as a result of no collision on the logical address 306.

The collision check unit 114 may perform the collision check and collision index entry provisioning in parallel with the controller firmware 110 allocating resources for the read and write operations to reduce Input/Output (I/O) latency. FIG. 4 shows the processing of an allocation on miss operation to cause the collision check unit 114 to add an index entry $300_i$ to the collision table 300 if there is a collision miss. However, there may be additional commands from the controller firmware 110 processed by the collision check unit 114, such as a search logical address command, allocate entry for logical address command, and a free index entry command.

For a search logical address command, the collision check unit 114 may just perform the steps of 402-414, and if no collision occurs, return a code through the output register 124 indicating there was no collision. For an allocate entry for logical address command, the collision check unit 114 may perform the operations at blocks 416-426 to add an index entry $300_i$ to the collision table 300 for a logical address. For a free index entry command, the collision check unit 114 may send a command identifying an index entry $300_i$ to cause the collision check unit to set the free flag 302 in the identified entry $300_i$ to free and indicate the entry $300_i$ at the tail pointer 122 of the free index table 120.

Figure 5:
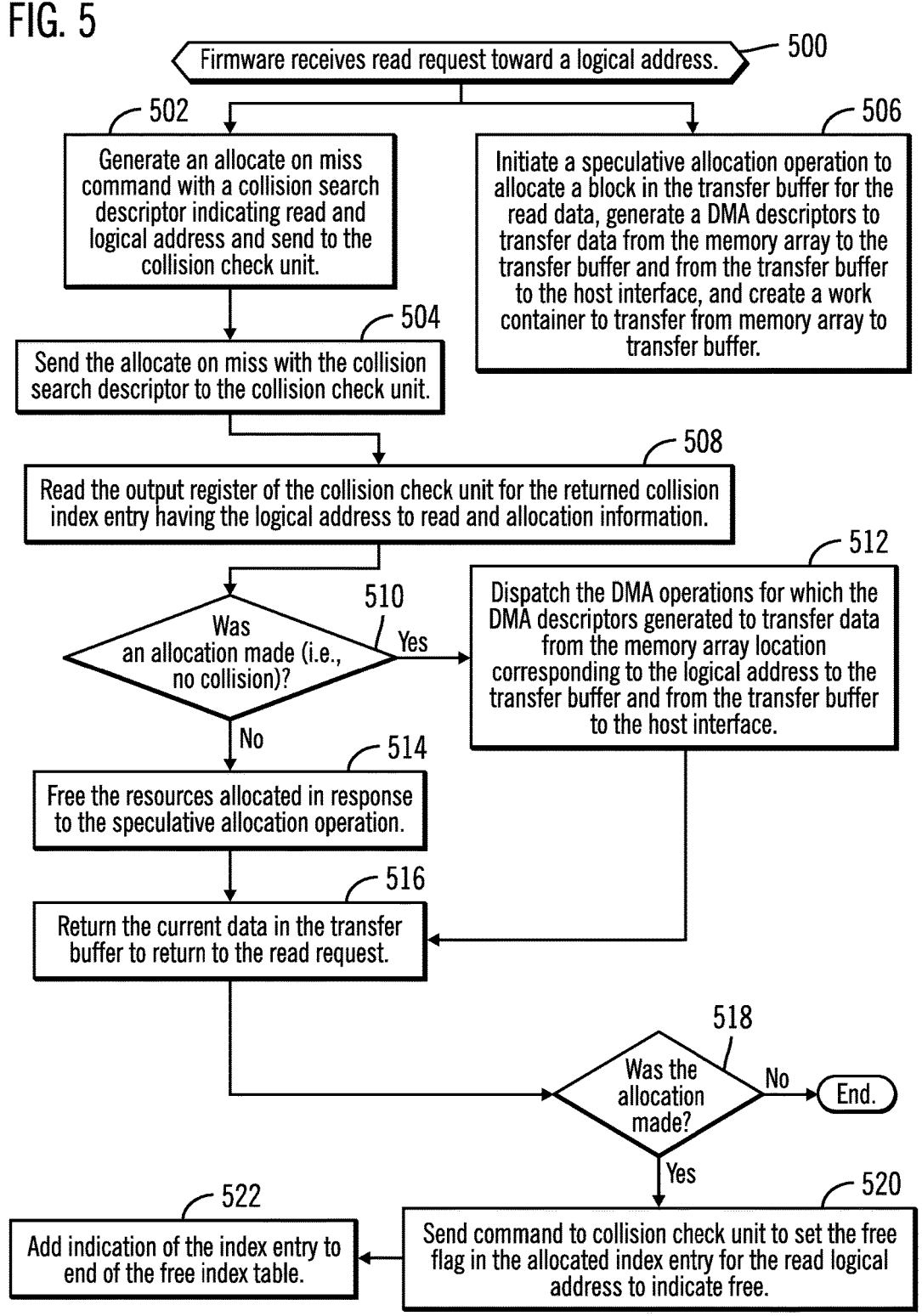
FIG. 5 illustrates an embodiment of operations to process a read request.

FIG. 5 illustrates an embodiment of operations performed by the controller firmware 110 to process a read request from the host interface 104. Upon receiving (at block 500) a read request toward a logical address, the controller firmware 110 generates (at block 502) an allocate on miss command with a collision search descriptor 200 indicating a read 202 and the logical address 204, and sends (at block 504) to the collision check unit 114. In parallel with the operation at blocks 502 and 504, the controller firmware 110 initiates (at block 506) a speculative allocation of resources for the read transfer, such as allocating a block in the transfer buffer 112 for the read data, generating Direct Memory Access (DMA) descriptors to transfer data from the storage dies $106_1, 106_2 \ldots 106_n$ to the transfer buffer 112 and from the transfer buffer 112 to the host interface 104, and creating a work container to transfer the data for the logical address from the storage dies $106_1, 106_2 \ldots 106_n$ to the transfer buffer 112 and from the transfer buffer 112 to the host interface 104. The allocation is speculative because the resources may not be used if there is a collision. In this way, the collision check unit 114 performs collision checking and resource allocation operations concurrently while the controller firmware 110 is performing speculative setup operations to prepare for the transfer of the read data from the storage dies $106_1, 106_2 \ldots 106_n$ to the transfer buffer 112 in the likely event there is no collision.

Upon completing the allocation on miss operation at the collision check unit 114, the controller firmware 110 reads (at block 508) the output register 124 for the returned collision index entry $300_i$ having the logical address to read and allocation information. If (at block 510) an allocation of an index entry $300_i$ was made, meaning no collision, then the DMA operation, for which the DMA descriptor was generated, is dispatched (at block 512) to transfer data from the storage dies $106_1, 106_2 \ldots 106_n$, corresponding to the requested logical address, to the transfer buffer 112. If (at block 510) the allocation of an index entry $300_i$ was not made, which occurs if there is no collision, then the collision search block 118 frees (at block 514) the resources allocated as part of the speculative allocation at block 506. From block 512 or 514, the current data in the transfer buffer 112 is returned (at block 516) to the read request. If (at block 518) an allocation of an index entry $300_i$ was made, if there was no collision, then the controller firmware 110 sends (at block 520) a command to collision check unit 114 to set the free flag 302 in the allocated index entry $300_i$ for the read logical address to indicate free. Indication of the index entry $300_i$ is added (at block 522) to the end of the free index table 120. If (at block 518) there was no allocation made of an index entry $300_i$, if there was a collision, then control ends.

With the operations of FIG. 5, when performing a read operation, the controller firmware 110 may invoke the collision check unit 114 to in parallel perform collision check and collision table index entry allocation operations while the controller firmware 110 in parallel prepares for the operations to transfer the requested logical address to read from the storage dies $106_1$, $106_2$ . . . $106_n$ to the transfer buffer 112 in the event there is no collision. Since a collision is less likely to occur than no collision, the speculative allocation and initialization operations performed at block 512 will more likely be used. However, in the event of collision, the resources allocated at block 512 may be discarded and data returned from the transfer buffer 112

Figure 6:
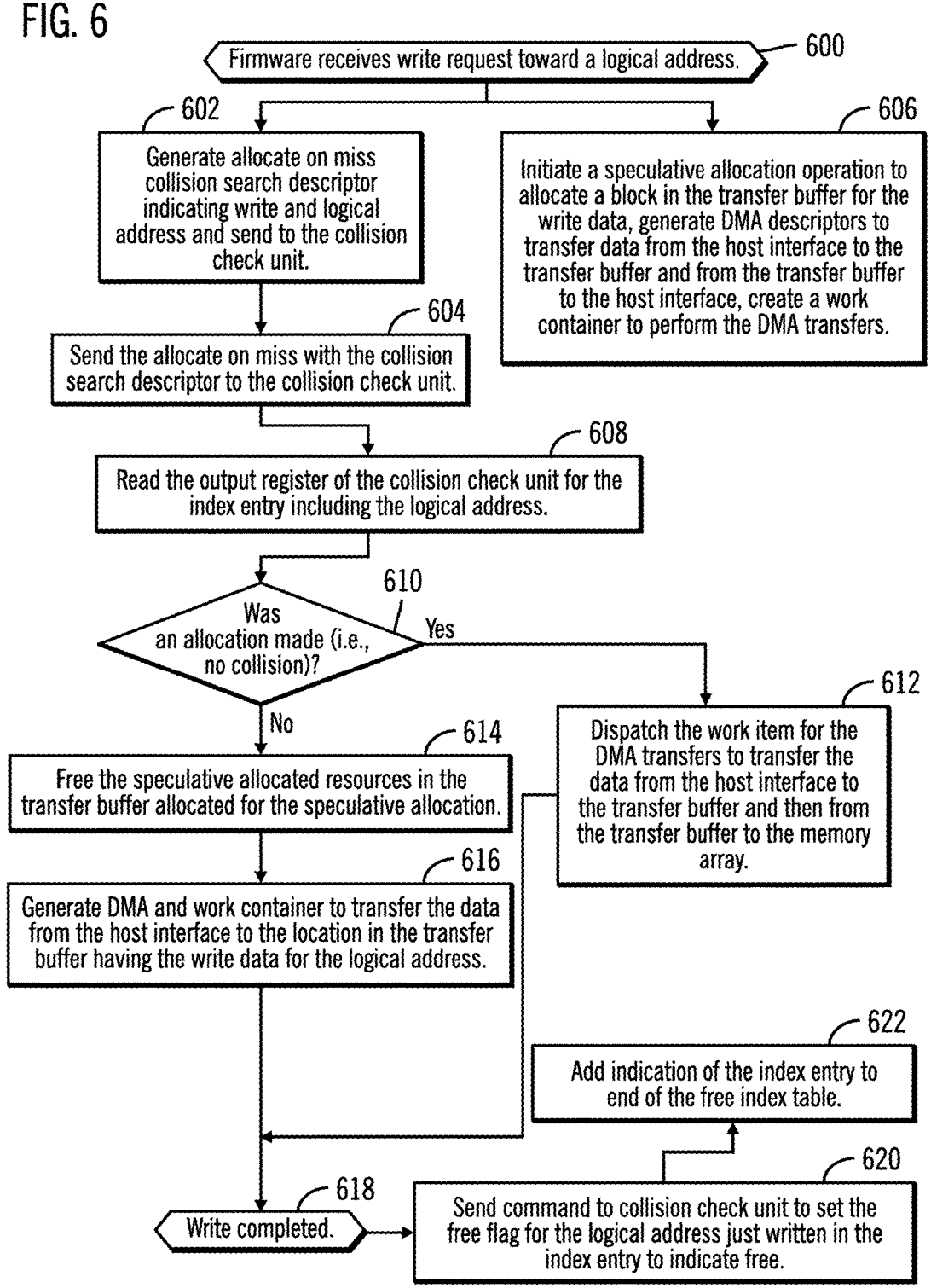
FIG. 6 illustrates an embodiment of operations to process a write request.

FIG. 6 illustrates an embodiment of operations performed by the controller firmware 110 to process a write request from the host interface 104. Upon receiving (at block 600) a write request toward a logical address, the controller firmware 110 generates (at block 602) an allocate on miss command with a collision search descriptor 200 indicating a write 202 and the logical address 204, and sends (at block 604) to the collision check unit 114. In parallel with the operation at blocks 602 and 604, the controller firmware 110 initiates (at block 606) a speculative allocation operation to allocate resources for the transfer, such as a block in the transfer buffer 112 for the write data, generate Direct Memory Access (DMA) descriptors to transfer data from the host interface 104 to the transfer buffer 112 and from the transfer buffer 112 to the storage dies $106_1$, $106_2$ . . . $106_n$, and create a work container to perform the transfer operations. In this way, the collision check unit 114 performs collision checking and allocation operations concurrently while the controller firmware 110 is performing setup operations to prepare for the transfer of the write data from the host interface 104 to the transfer buffer 112 in the likely event there is no collision.

Upon completing the allocation on miss operation at the collision check unit 114, the controller firmware 110 reads (at block 608) the output register 124 for the returned collision index entry $300_i$ having the logical address to write and allocation information. If (at block 610) an allocation of an index entry was made, meaning no collision, then the DMA operation is dispatched (at block 612) for which the DMA descriptor generated to transfer data from the storage die $106_1$, $106_2$ . . . $106_n$ location, corresponding to the requested logical address, to the transfer buffer 112. If (at block 610) the allocation of an index entry $300_i$ was not made, which occurs if there is no collision, then the collision search block 118 frees (at block 614) the speculative allocated resources and generates (at block 616) a DMA and work container to transfer the data from the host interface 104 to the location in the transfer buffer 112 having the write data for the logical address. From block 612 or 616, upon the write completing (at block 618), the controller firmware 110 sends (at block 620) a command to the collision check unit 114 to set the free flag 302 for the logical address 306 just written in the index entry $300_i$ to indicate free. Indication of the index entry $300_i$ just freed is added (at block 622) to the end of the free index table 120.

With the operations of FIG. 6, when performing a write operation, the controller firmware 110 may invoke the collision check unit 114 to in parallel perform collision check and collision table index entry allocation operations while the controller firmware 110 in parallel prepares for the operations to transfer data to write for the requested logical address from the host interface 104 to the transfer buffer 112 to the storage dies $106_1$, $106_2$ . . . $106_n$. Since a collision is less likely to occur than no collision, the speculative allocation and initialization operations performed at block 606 will more likely be used. However, in the event of collision, the speculative allocation of at block 606 may be discarded and the write written to an existing location in the transfer buffer 112 having write data for the logical address.

Figure 7:
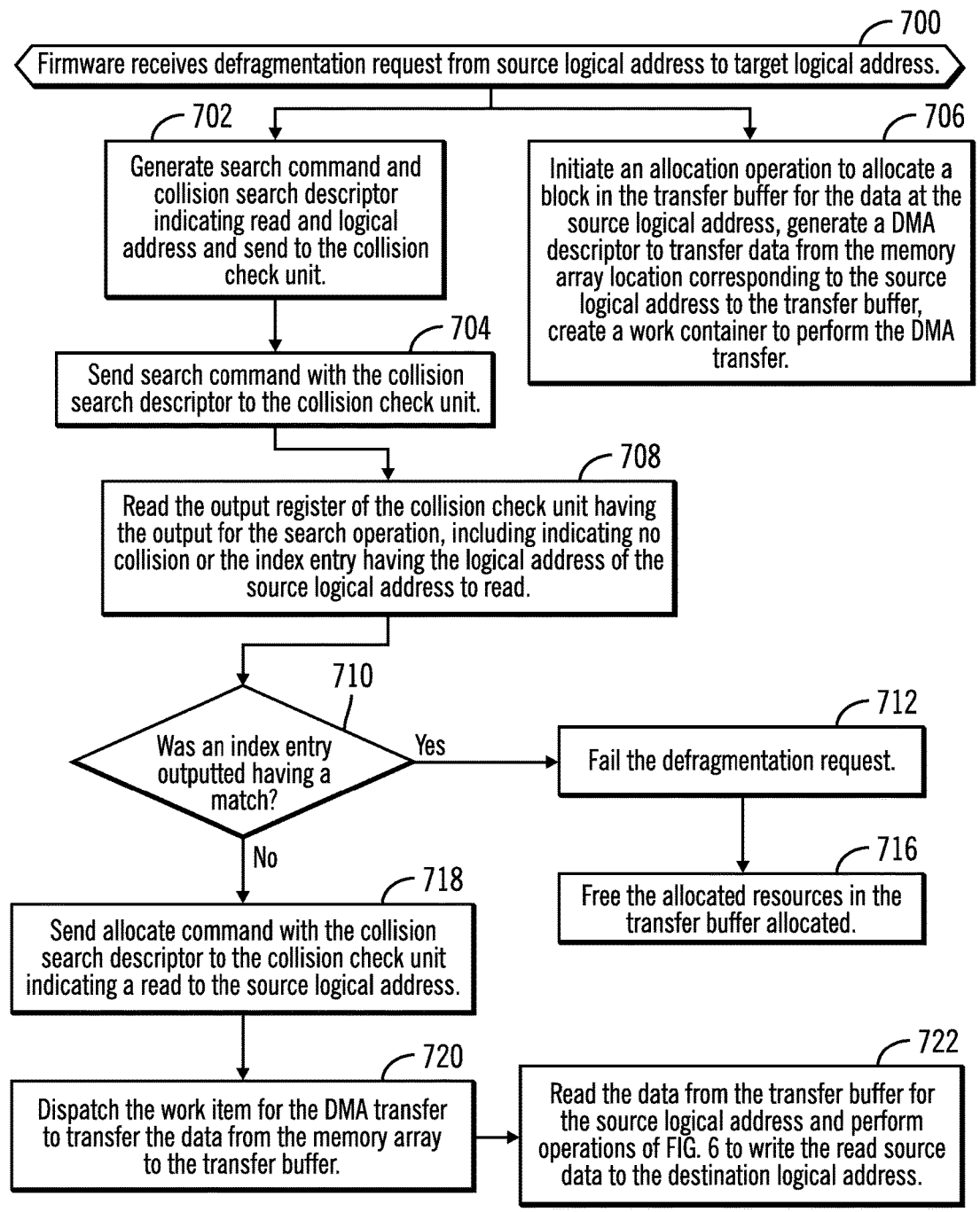
FIG. 7 illustrates an embodiment of operations to process a defragmentation operation.

FIG. 7 illustrates an embodiment of operations performed by the controller firmware 110 to process a defragmentation request to transfer data from a source logical address to a target logical address as part of a defragmentation or other operation. Upon receiving (at block 700) a defragmentation request from the source logical address to the target logical address, the controller firmware 110 generates (at block 702) a search command with a collision search descriptor 200 indicating a read 202 and the logical address 204, and sends (at block 704) to the collision check unit 114. In parallel with the operations at blocks 702 and 704, the controller firmware 110 initiates (at block 706) a speculative resource allocation operation to allocate a block in the transfer buffer 112 for the data at the source logical address in the storage dies $106_1$, $106_2$ . . . $106_n$, generate Direct Memory Access (DMA) descriptors to transfer data from the storage die $106_1$, $106_2$ . . . $106_n$ location having data for the source logical address to the transfer buffer 112, and create a work container to perform the transfer operations. In this way, the collision check unit 114 performs collision checking and allocation operations concurrently while the controller firmware 110 is performing setup operations to prepare for the read of the source logical address in the likely event there is no collision.

Upon completing the allocation on miss operation at the collision check unit 114, the controller firmware 110 reads (at block 708) the output register 124 of the collision check unit 114 having the output for the search operation, including indicating no collision or the index entry $300_i$ having the source logical address to read. If (at block 710) there was an index entry $300_i$ having a logical address matching that in the search descriptor 200, i.e., a collision, then the controller firmware 110 issues a command (at block 712) to fail the defragmentation request and free (at block 716) the speculative allocated resources in the transfer buffer 112 and the DMA descriptor.

If (at block 710) there was no matching entry, i.e., no collision, then the controller firmware 110 sends (at block 718) an allocate command with the collision search descriptor 200 to the collision check unit indicating a read to the source logical address to add an index entry $300_i$ for the source logical address. The work items for the DMA transfer are dispatched (at block 720) to transfer the data at the source logical address from the storage dies $106_1$, $106_2$ . . . $106_n$ to the transfer buffer 112. The controller firmware 110 reads (at block 722) the data from the transfer buffer 112 for the source logical address and performs operations of FIG. 6 to write the read source data to the destination logical address.

With the operations of FIG. 7, the collision check unit 114 can in parallel perform the operations to read and write to and from the transfer buffer 112 while the controller firmware 110 can allocate resources in the transfer buffer 112 and DMA descriptors for the transferring of data. In the described operations of FIG. 7, if there is a collision match, then the logical address 306 in the index entry $300_i$ is updated to indicate the destination logical address. In alternative embodiments, instead of failing the defragmentation request at block 712, the current data in the transfer buffer 112 for the source logical address may be directly copied to the destination logical address, and the index entry $300_i$ for the defragmentation operation may be freed in response to determining the collision to allow the pending write to the source logical address in the transfer buffer 112 to be transferred to the storage dies $106_1, 106_2 \ldots 106_n$.

Figure 8:
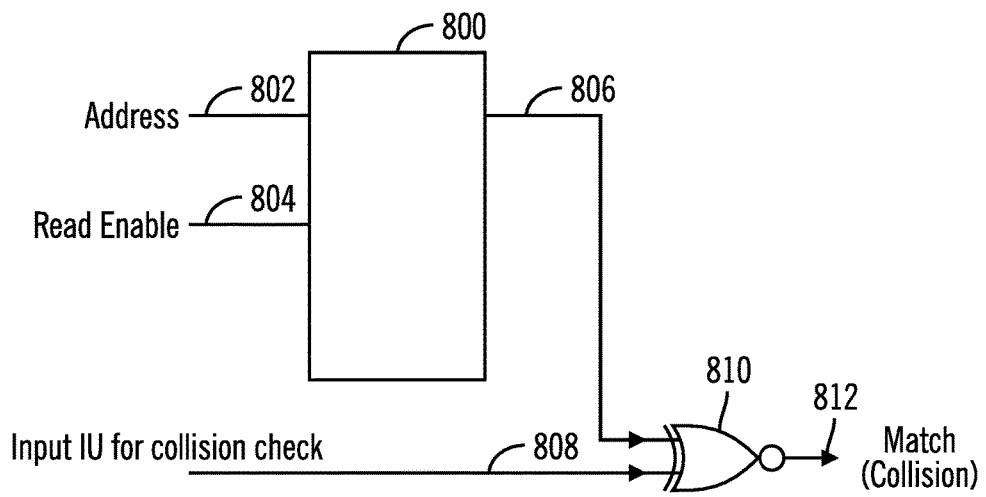
FIGS. 8 and 9 illustrate embodiments of collision check hardware.

FIG. 8 illustrates an embodiment of a hardware implementation of the collision search block 118 that has all the collision table 300 entries stored in buffer 800. For instance, if the transfer buffer 112 is 6 MB with 4 KB blocks of data for a logical address, then the buffer 800 needs to store the logical address 306 for 1.5K table entries 300. The index entry $300_i$ number is inputted on the address line 802 with read 804 enable to cause the logical address 306 for the index entry $300_i$ to be outputted on line 806 to a comparator 810. When the index entry number is asserted on the address line 802, the logical address 204 for the collision check from the collision search descriptor 200 is applied to input line 808 to provide to the comparator 810 to compare with the logical address 306 outputted on the output line 806. The comparator 808 provides output 812 indicating whether there was a match.

Figure 9:
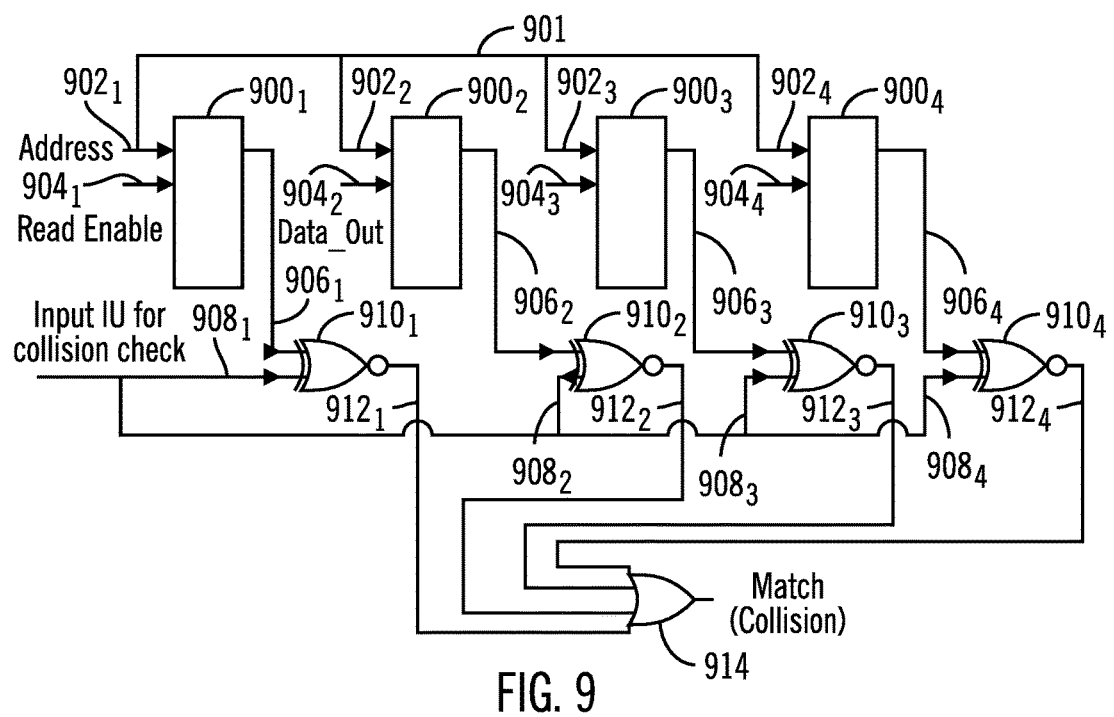

FIG. 9 illustrates an alternative embodiment of the implementation of the collision search block 118 that has the collision table entries 300 divided among different memory units $900_1, 900_2, 900_3, 900_4$ for parallel search on collision check sub-units when the index entry $300_i$ number is applied on a common address line 901 to go to each address line $902_1, 902_2, 902_3, 902_4$ of each of the collision check sub-units. Each collision check sub-unit includes the same components $900_i, 902_i, 904_i, 906_i, 908_i, 910_i, 912_i$ corresponding to the components 800, 802, 804, 806, 808, and 810 in FIG. 8 to perform the same operations with respect to a subset of the collision table entries 300 at each collision check sub-unit. The output $912_1, 912_2, 912_3, 912_4$ of all the comparisons is XORed in logic 914 to produce an output indicate whether there is a match. The hardware logic of FIG. 9 results in better performance over the hardware of FIG. 8 by allowing for parallel search of subsets of the collision search table 300.

Figure 10:
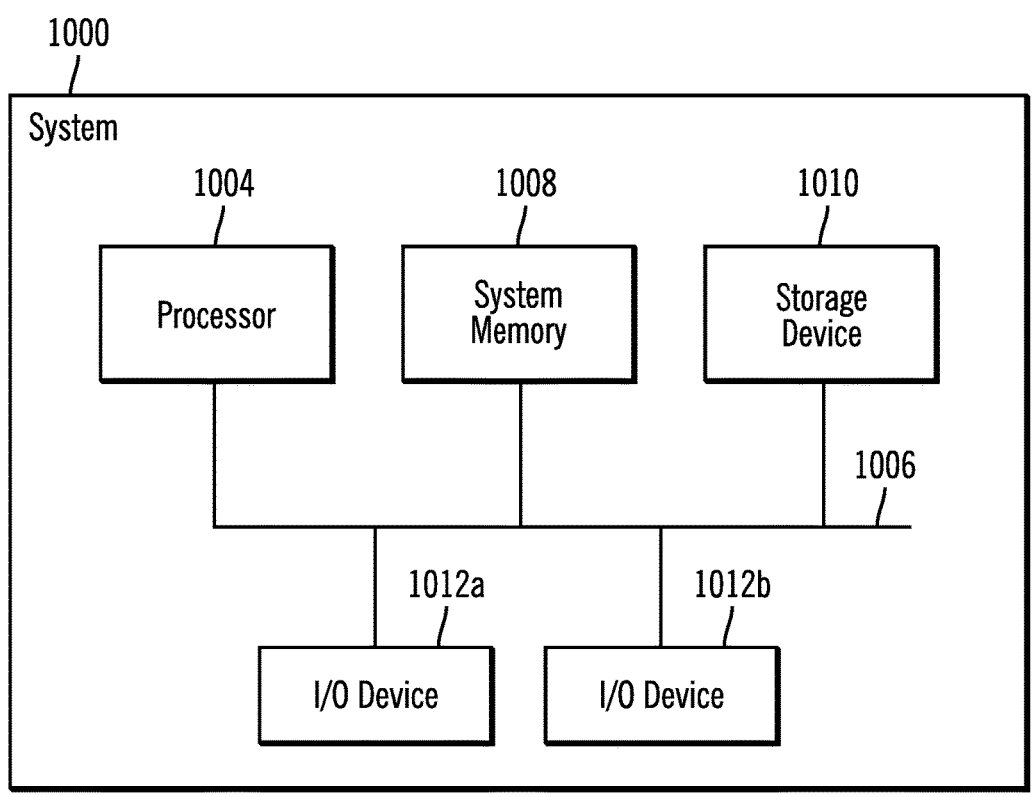
FIG. 10 illustrates a system in which the memory device of FIG. 1 may be deployed.

FIG. 10 illustrates an embodiment of a system 1000 in which the memory device 100 may be deployed as the system memory device 1008 and/or a storage device 1010. The system includes a processor 1004 that communicates over a bus 1006 with a system memory device 1008 in which programs, operands and parameters being executed are cached, and a storage device 1010, which may comprise a solid state drive (SSD) that stores programs and user data that may be loaded into the system memory 1008 for execution. The processor 1004 may also communicate with Input/Output (I/O) devices 1012a, 1012b, which may comprise input devices (e.g., keyboard, touchscreen, mouse, etc.), display devices, graphics cards, ports, network interfaces, etc. The memory 1008 and storage device 1010 may be coupled to an interface on the system 1000 motherboard, mounted on the system 1000 motherboard, or deployed in an external memory device or accessible over a network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

The reference characters used herein, such as i and n, are used to denote a variable number of instances of an element, which may represent the same or different values, and may represent the same or different value when used with different or the same elements in different described instances.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

The following examples pertain to further embodiments.

Example 1 is an apparatus to offload collision check operations to determine whether data in a non-volatile memory for a request is located in a buffer, comprising: a non-volatile memory; a collision check unit including a collision table including logical addresses for pending Input/Output (I/O) requests; a transfer buffer to buffer data being written and read from the non-volatile memory; and a memory controller to: receive an I/O request to a target logical address in the non-volatile memory, wherein the I/O request comprises at least one of a read and write request to the target logical address; send the logical address to the collision check unit; allocate resources to transfer data with respect to the transfer buffer to data for the I/O request while the collision check unit to determine whether the collision table includes the target logical address; and wherein the collision check unit to determine whether the collision table includes the target logical address and to return an indication of whether the collision table includes the target logical address to indicate that current data for the target logical address is already in the transfer buffer.

In Example 2, the subject matter of examples 1 and 3-11 can optionally include that the memory controller is further to: free the allocated resources in response to determine the collision table includes the target logical address.

In Example 3, the subject matter of examples 1, 2, and 4-11 can optionally include that in response to determine that the collision table does not include the target logical address, the memory controller is further to: select a free index entry in the collision table; indicate the target logical address in the selected free index entry; and indicate the selected free index entry as not free.

In Example 4, the subject matter of examples 1-3 and 5-11 can optionally include that the collision check unit is comprised of multiple collision check sub-units, wherein each of the collision check sub-units stores a subset of entries in the collision table and performs a parallel search on the subset of entries in the collision table to determine whether the target logical address matches one of the subset of entries searched by the collision check sub-unit.

In Example 5, the subject matter of examples 1-4 and 6-11 can optionally include that the memory controller is further to: write data for the I/O request, comprising a write request, to the transfer buffer at a location in the transfer buffer already having data for the target logical address when the collision check unit returns the indication that the collision table already includes the target logical address; and read data for the I/O request, comprising a read request, at an address in the transfer buffer already including the data for the target logical address when the collision check unit returns the indication that the collision table already includes the target logical address.

In Example 6, the subject matter of examples 1-5 and 7-11 can optionally include that the memory controller is further to: receive a defragmentation request to move data at a source logical address in the non-volatile memory to a destination logical address in the non-volatile memory; in response to the defragmentation request: send the source logical address to the collision check unit to determine whether the collision table includes the source logical address; allocate resources to transfer data for the source logical address from the non-volatile memory to the transfer buffer while the collision check unit is determining whether the collision table includes the source logical address; use the allocated resources to transfer data for the source logical address to the transfer buffer in response to determining that the collision table includes the source logical address; and issue a command to the collision check unit to indicate the destination logical address in the collision table in response to determining that the collision table does not include the source logical address, wherein the collision check unit indicates the destination logical address in the collision table.

In Example 7, the subject matter of examples 1-6 and 8-11 can optionally include that the memory controller is further to: fail the defragmentation request in response to determining that the collision table includes the source logical address.

In Example 8, the subject matter of examples 1-7 and 9-11 can optionally include that the collision table includes index entries, each index entry having a free flag indicating whether the index entry is free and available for use and a search flag indicating whether the collision check unit will determine whether the index entry includes the target logical address, wherein the collision check unit is further to ignore, one of the index entries when determining whether one of the index entries includes the target logical address when the search flag for the index entry indicates to not search or when the free flag indicates that the index entry is free.

In Example 9, the subject matter of examples 1-8 and 10-11 can optionally include that in response to determining that the collision table does not include the index entry, collision check unit is further to: select an index entry in the collision table having a free flag indicating that the index entry is free; indicate the target logical address in the selected index entry; and set the free flag in the selected index entry to indicate not free.

In Example 10, the subject matter of examples 1-9 and 11 can optionally include that the memory controller is further to: indicate in the search flag for the selected index entry to not determine whether the index entry includes the target logical address when the I/O request comprises a read access; and indicate in the search flag for the selected index entry to determine whether the index entry includes the target logical address when the I/O request comprises a write access.

In Example 11, the subject matter of examples 1-10 can optionally include that the collision check unit and the transfer buffer are implemented in the memory controller.

Example 12 is a system to offload collision check operations to determine whether data in a non-volatile memory for a request is located in a buffer, comprising: a host computer; a non-volatile memory storage device coupled to the host computer, wherein the host computer communicates Input/Output (I/O) requests to the non-volatile memory storage device, comprising: a non-volatile memory; a collision check unit including a collision table including logical addresses for pending I/O requests; a transfer buffer to buffer data being written and read from the non-volatile memory; and a memory controller to: receive an I/O request to a target logical address in the non-volatile memory, wherein the I/O request comprises at least one of a read and write request to the target logical address; send the logical address to the collision check unit; allocate resources to transfer data with respect to the transfer buffer to data for the I/O request while the collision check unit to determine whether the collision table includes the target logical address; and wherein the collision check unit to determine whether the collision table includes the target logical address and to return an indication of whether the collision table includes the target logical address to indicate that current data for the target logical address is already in the transfer buffer.

In Example 13, the subject matter of examples 12 and 14-18 can optionally include that in response to determine that the collision table does not include the target logical address, the memory controller is further to: select a free index entry in the collision table; indicate the target logical address in the selected free index entry; and indicate the selected free index entry as not free.

In Example 14, the subject matter of examples 12, 13 and 15-18 can optionally include that the memory controller is further to: write data for the I/O request, comprising a write request, to the transfer buffer at a location in the transfer buffer already having data for the target logical address when the collision check unit returns the indication that the collision table already includes the target logical address; and read data for the I/O request, comprising a read request, at an address in the transfer buffer already including the data for the target logical address when the collision check unit returns the indication that the collision table already includes the target logical address.

In Example 15, the subject matter of examples 12-14 and 16-18 can optionally include that the memory controller is further to: receive a defragmentation request to move data at a source logical address in the non-volatile memory to a destination logical address in the non-volatile memory; in response to the defragmentation request: send the source logical address to the collision check unit to determine whether the collision table includes the source logical address; allocate resources to transfer data for the source logical address from the non-volatile memory to the transfer buffer while the collision check unit is determining whether the collision table includes the source logical address; use the allocated resources to transfer data for the source logical address to the transfer buffer in response to determining that the collision table includes the source logical address; and issue a command to the collision check unit to indicate the destination logical address in the collision table in response to determining that the collision table does not include the source logical address, wherein the collision check unit indicates the destination logical address in the collision table.

In Example 16, the subject matter of examples 12-15 and 17-18 can optionally include that the collision table includes index entries, each index entry having a free flag indicating whether the index entry is free and available for use and a search flag indicating whether the collision check unit will determine whether the index entry includes the target logical address, wherein the collision check unit is further to ignore, one of the index entries when determining whether one of the index entries includes the target logical address when the search flag for the index entry indicates to not search or when the free flag indicates that the index entry is free.

In Example 17, the subject matter of examples 12-16 and 18 can optionally include that in response to determining that the collision table does not include the index entry, collision check unit is further to: select an index entry in the collision table having a free flag indicating that the index entry is free; indicate the target logical address in the selected index entry; and set the free flag in the selected index entry to indicate not free.

In Example 18, the subject matter of examples 12-17 can optionally include that the memory controller is further to: indicate in the search flag for the selected index entry to not determine whether the index entry includes the target logical address when the I/O request comprises a read access; and indicate in the search flag for the selected index entry to determine whether the index entry includes the target logical address when the I/O request comprises a write access.

Example 19 is a method for offloading collision check operations to determine whether data in a non-volatile memory for a request is located in a buffer comprising: maintaining in a collision check unit a collision table including logical addresses for pending Input/Output (I/O) requests; buffering, in a transfer buffer, data being written and read from the non-volatile memory; and receiving an I/O request to a target logical address addressing a block of data in the non-volatile memory, wherein the I/O request comprises at least one of a read and write request to the target logical address; sending the logical address to the collision check unit; allocating resources to transfer data with respect to the transfer buffer to data for the I/O request in parallel while the collision check unit is determining whether the collision table includes the target logical address; and determining, by the collision check unit, whether the collision table includes the target logical address and returns indication of whether the collision table includes the target logical address indicating that current data for the target logical address is already in the transfer buffer.

In Example 20, the subject matter of examples 19 and 21-25 can optionally include in response to determining that the collision table does not include the target logical address: selecting a free index entry in the collision table; indicating the target logical address in the selected free index entry; and indicating the selected free index entry as not free.

In Example 21, the subject matter of examples 19, 20 and 22-25 can optionally include writing data for the I/O request, comprising a write request, to the transfer buffer at a location in the transfer buffer already having data for the target logical address when the collision check unit returns the indication that the collision table already includes the target logical address; and reading data for the I/O request, comprising a read request, at an address in the transfer buffer already including the data for the target logical address when the collision check unit returns the indication that the collision table already includes the target logical address.

In Example 22, the subject matter of examples 19-21 and 23-25 can optionally include receiving a defragmentation request to move data at a source logical address in the non-volatile memory to a destination logical address in the non-volatile memory; in response to the defragmentation request: sending the source logical address to the collision check unit to determine whether the collision table includes the source logical address; allocating resources to transfer data for the source logical address from the non-volatile memory to the transfer buffer while the collision check unit is determining whether the collision table includes the source logical address; using the allocated resources to transfer data for the source logical address to the transfer buffer in response to determining that the collision table includes the source logical address; and issuing a command to the collision check unit to indicate the destination logical address in the collision table in response to determining that the collision table does not include the source logical address, wherein the collision check unit indicates the destination logical address in the collision table.

In Example 23, the subject matter of examples 19-22 and 24-25 can optionally include that the collision table includes index entries, each index entry having a free flag indicating whether the index entry is free and available for use and a search flag indicating whether the collision check unit will determine whether the index entry includes the target logical address, wherein the collision check unit is further to ignore, one of the index entries when determining whether one of the index entries includes the target logical address when the search flag for the index entry indicates to not search or when the free flag indicates that the index entry is free.

In Example 24, the subject matter of examples 19-23 and 25 can optionally include that in response to determining that the collision table does not include the index entry, performing, by the collision check unit: selecting an index entry in the collision table having a free flag indicating that the index entry is free; and indicating the target logical address in the selected index entry; and set the free flag in the selected index entry to indicate not free.

In Example 25, the subject matter of examples 19-24 can optionally include indicating in the search flag for the selected index entry to not determine whether the index entry includes the target logical address when the I/O request comprises a read access; and indicating in the search flag for the selected index entry to determine whether the index entry includes the target logical address when the I/O request comprises a write access.

Example 26 is an apparatus for offloading collision check operations to determine whether data in a non-volatile memory for a request is located in a buffer comprising: means for maintaining in a collision check unit a collision table including logical addresses for pending Input/Output (I/O) requests; means for buffering, in a transfer buffer, data being written and read from the non-volatile memory; means for receiving an I/O request to a target logical address addressing a block of data in the non-volatile memory, wherein the I/O request comprises at least one of a read and write request to the target logical address; means for sending the logical address to the collision check unit; means for allocating resources to transfer data with respect to the transfer buffer to data for the I/O request in parallel while the collision check unit is determining whether the collision table includes the target logical address; and means for determining whether the collision table includes the target logical address and returns indication of whether the collision table includes the target logical address indicating that current data for the target logical address is already in the transfer buffer.

Example 27 is a machine-readable storage including machine-readable instructions, when executed, to implement a method or realize an apparatus as in any preceding examples 21-26.

What is claimed:

1. An apparatus, comprising:
a non-volatile memory;
a collision check unit including a collision table including logical addresses for pending Input/Output (I/O) requests;
a transfer buffer to buffer data being written and read from the non-volatile memory; and
a memory controller to:
receive an I/O request to a target logical address in the non-volatile memory, wherein the I/O request comprises at least one of a read and write request to the target logical address;
send the logical address to the collision check unit;
allocate resources to transfer data with respect to the transfer buffer for the I/O request while the collision check unit determines whether the collision table includes the target logical address; and
wherein the collision check unit determines whether the collision table includes the target logical address and returns an indication of whether the collision table includes the target logical address to indicate that current data for the target logical address is already in the transfer buffer.

2. The apparatus of claim 1, wherein the memory controller is further to:
free the allocated resources in response to determine the collision table includes the target logical address.

3. The apparatus of claim 1, wherein in response to determine that the collision table does not include the target logical address, the memory controller is further to:
select a free index entry in the collision table;
indicate the target logical address in the selected free index entry; and
indicate the selected free index entry as not free.

4. The apparatus of claim 1, wherein the collision check unit is comprised of multiple collision check sub-units, wherein each of the collision check sub-units stores a subset of entries in the collision table and performs a parallel search on the subset of entries in the collision table to determine whether the target logical address matches one of the subset of entries searched by the collision check sub-unit.

5. The apparatus of claim 1, wherein the memory controller is further to:
write data for the I/O request, comprising a write request, to the transfer buffer at a location in the transfer buffer already having data for the target logical address when the collision check unit returns the indication that the collision table already includes the target logical address; and
read data for the I/O request, comprising a read request, at an address in the transfer buffer already including the data for the target logical address when the collision check unit returns the indication that the collision table already includes the target logical address.

6. The apparatus of claim 1, wherein the memory controller is further to:

receive a defragmentation request to move data at a source logical address in the non-volatile memory to a destination logical address in the non-volatile memory;
in response to the defragmentation request:
send the source logical address to the collision check unit to determine whether the collision table includes the source logical address;
allocate resources to transfer data for the source logical address from the non-volatile memory to the transfer buffer while the collision check unit is determining whether the collision table includes the source logical address;
use the allocated resources to transfer data for the source logical address to the transfer buffer in response to determining that the collision table includes the source logical address; and
issue a command to the collision check unit to indicate the destination logical address in the collision table in response to determining that the collision table does not include the source logical address, wherein the collision check unit indicates the destination logical address in the collision table.

7. The apparatus of claim 6, wherein the memory controller is further to:
fail the defragmentation request in response to determining that the collision table includes the source logical address.

8. The apparatus of claim 1, wherein the collision table includes index entries, each index entry having a free flag indicating whether the index entry is free and available for use and a search flag indicating whether the collision check unit will determine whether the index entry includes the target logical address,
wherein the collision check unit is further to ignore one of the index entries when determining whether one of the index entries includes the target logical address when the search flag for the index entry indicates to not search or when the free flag indicates that the index entry is free.

9. The apparatus of claim 8, wherein in response to determining that the collision table does not include the index entry, the collision check unit is further to:
select an index entry in the collision table having a free flag indicating that the index entry is free;
indicate the target logical address in the selected index entry; and
set the free flag in the selected index entry to indicate not free.

10. The apparatus of claim 9, wherein the memory controller is further to:
indicate in the search flag for the selected index entry to not determine whether the index entry includes the target logical address when the I/O request comprises a read access; and
indicate in the search flag for the selected index entry to determine whether the index entry includes the target logical address when the I/O request comprises a write access.

11. The apparatus of claim 1, wherein the collision check unit and the transfer buffer are implemented in the memory controller.

12. A system, comprising:
a host computer; and
a non-volatile memory storage device coupled to the host computer, wherein the host computer communicates Input/Output (I/O) requests to the non-volatile memory storage device, comprising:

a non-volatile memory;
a collision check unit including a collision table including logical addresses for pending I/O requests;
a transfer buffer to buffer data being written and read from the non-volatile memory; and
a memory controller to:
receive an I/O request to a target logical address in the non-volatile memory, wherein the I/O request comprises at least one of a read and write request to the target logical address;
send the logical address to the collision check unit;
allocate resources to transfer data with respect to the transfer buffer for the I/O request while the collision check unit determines whether the collision table includes the target logical address; and
wherein the collision check unit determines whether the collision table includes the target logical address and returns an indication of whether the collision table includes the target logical address to indicate that current data for the target logical address is already in the transfer buffer.

13. The system of claim 12, wherein in response to determine that the collision table does not include the target logical address, the memory controller is further to:
select a free index entry in the collision table;
indicate the target logical address in the selected free index entry; and
indicate the selected free index entry as not free.

14. The system of claim 12, wherein the memory controller is further to:
write data for the I/O request, comprising a write request, to the transfer buffer at a location in the transfer buffer already having data for the target logical address when the collision check unit returns the indication that the collision table already includes the target logical address; and
read data for the I/O request, comprising a read request, at an address in the transfer buffer already including the data for the target logical address when the collision check unit returns the indication that the collision table already includes the target logical address.

15. The system of claim 12, wherein the memory controller is further to:
receive a defragmentation request to move data at a source logical address in the non-volatile memory to a destination logical address in the non-volatile memory;
in response to the defragmentation request:
send the source logical address to the collision check unit to determine whether the collision table includes the source logical address;
allocate resources to transfer data for the source logical address from the non-volatile memory to the transfer buffer while the collision check unit is determining whether the collision table includes the source logical address;
use the allocated resources to transfer data for the source logical address to the transfer buffer in response to determining that the collision table includes the source logical address; and
issue a command to the collision check unit to indicate the destination logical address in the collision table in response to determining that the collision table does not include the source logical address, wherein the collision check unit indicates the destination logical address in the collision table.

16. The system of claim 12, wherein the collision table includes index entries, each index entry having a free flag indicating whether the index entry is free and available for use and a search flag indicating whether the collision check unit will determine whether the index entry includes the target logical address,
wherein the collision check unit is further to ignore one of the index entries when determining whether one of the index entries includes the target logical address when the search flag for the index entry indicates to not search or when the free flag indicates that the index entry is free.

17. The system of claim 16, wherein in response to determining that the collision table does not include the index entry, collision check unit is further to:
select an index entry in the collision table having a free flag indicating that the index entry is free;
indicate the target logical address in the selected index entry; and
set the free flag in the selected index entry to indicate not free.

18. The system of claim 17, wherein the memory controller is further to:
indicate in the search flag for the selected index entry to not determine whether the index entry includes the target logical address when the I/O request comprises a read access; and
indicate in the search flag for the selected index entry to determine whether the index entry includes the target logical address when the I/O request comprises a write access.

19. A method for processing Input/Output (I/O) requests to a non-volatile memory comprised of storage dies, comprising:
maintaining in a collision check unit a collision table including logical addresses for pending Input/Output (I/O) requests;
buffering, in a transfer buffer, data being written and read from the non-volatile memory; and
receiving an I/O request to a target logical address addressing a block of data in the non-volatile memory, wherein the I/O request comprises at least one of a read and write request to the target logical address;
sending the logical address to the collision check unit;
allocating resources to transfer data with respect to the transfer buffer for the I/O request while the collision check unit is determining whether the collision table includes the target logical address; and
determining, by the collision check unit, whether the collision table includes the target logical address and returns indication of whether the collision table includes the target logical address indicating that current data for the target logical address is already in the transfer buffer.

20. The method of claim 19, further comprising:
in response to determining that the collision table does not include the target logical address:
selecting a free index entry in the collision table;
indicating the target logical address in the selected free index entry; and
indicating the selected free index entry as not free.

21. The method of claim 19, further comprising:
writing data for the I/O request, comprising a write request, to the transfer buffer at a location in the transfer buffer already having data for the target logical address when the collision check unit returns the indication that the collision table already includes the target logical address; and reading data for the I/O request, comprising a read request, at an address in the transfer buffer already including the data for the target logical address when the collision check unit returns the indication that the collision table already includes the target logical address.

22. The method of claim 19, further comprising:

receiving a defragmentation request to move data at a source logical address in the non-volatile memory to a destination logical address in the non-volatile memory;

in response to the defragmentation request:
 sending the source logical address to the collision check unit to determine whether the collision table includes the source logical address;
 allocating resources to transfer data for the source logical address from the non-volatile memory to the transfer buffer while the collision check unit is determining whether the collision table includes the source logical address;
 using the allocated resources to transfer data for the source logical address to the transfer buffer in response to determining that the collision table includes the source logical address; and
 issuing a command to the collision check unit to indicate the destination logical address in the collision table in response to determining that the collision table does not include the source logical address, wherein the collision check unit indicates the destination logical address in the collision table.

23. The method of claim 19, wherein the collision table includes index entries, each index entry having a free flag indicating whether the index entry is free and available for use and a search flag indicating whether the collision check unit will determine whether the index entry includes the target logical address,
 wherein the collision check unit is further to ignore one of the index entries when determining whether one of the index entries includes the target logical address when the search flag for the index entry indicates to not search or when the free flag indicates that the index entry is free.

24. The method of claim 23, further comprising:

wherein in response to determining that the collision table does not include the index entry, performing, by the collision check unit:
 selecting an index entry in the collision table having a free flag indicating that the index entry is free;
 indicating the target logical address in the selected index entry; and
 set the free flag in the selected index entry to indicate not free.

25. The method of claim 24, further comprising:

indicating in the search flag for the selected index entry to not determine whether the index entry includes the target logical address when the I/O request comprises a read access; and indicating in the search flag for the selected index entry to determine whether the index entry includes the target logical address when the I/O request comprises a write access.

* * * * *